United States Patent
Cannistraro et al.

(10) Patent No.: US 11,282,487 B2
(45) Date of Patent: Mar. 22, 2022

(54) VARIATIONS AUDIO PLAYBACK

(71) Applicant: Weav Music Limited, London (GB)

(72) Inventors: Alan Cannistraro, London (GB); Daniel Danilatos, London (GB); Zhi Frank Huang, London (GB); Nick Launay, London (GB); Lars Rasmussen, London (GB); Georgia Elomida Visviki, London (GB)

(73) Assignee: Weav Music Inc., Brooklyn, NY (US)

( * ) Notice: Subject to any disclaimer, the term of this patent is extended or adjusted under 35 U.S.C. 154(b) by 0 days.

(21) Appl. No.: 16/467,919

(22) PCT Filed: Dec. 7, 2017

(86) PCT No.: PCT/GB2017/053691
§ 371 (c)(1),
(2) Date: Jun. 7, 2019

(87) PCT Pub. No.: WO2018/104745
PCT Pub. Date: Jun. 14, 2018

(65) Prior Publication Data
US 2020/0074969 A1    Mar. 5, 2020

(30) Foreign Application Priority Data

Dec. 7, 2016 (GB) .................................... 1620838

(51) Int. Cl.
*G10H 1/40* (2006.01)
*A63B 71/06* (2006.01)
(Continued)

(52) U.S. Cl.
CPC ........... *G10H 1/40* (2013.01); *A63B 71/0686* (2013.01); *G10H 1/0025* (2013.01);
(Continued)

(58) Field of Classification Search
CPC .......................... A63B 71/0686; G11B 27/105
See application file for complete search history.

(56) References Cited

U.S. PATENT DOCUMENTS

| 6,703,549 B1 | 3/2004 | Nishimoto et al. |
| 8,392,007 B1 | 3/2013 | Izo et al. |

(Continued)

FOREIGN PATENT DOCUMENTS

| EP | 1557836 | 7/2005 |
| JP | H01205197 | 8/1989 |

(Continued)

OTHER PUBLICATIONS

International Search Report and Written Opinion dated Mar. 8, 2018 in International Patent Application No. PCT/GB2017/053691.
(Continued)

*Primary Examiner* — Mishawn N. Hunter
(74) *Attorney, Agent, or Firm* — Byrne Poh LLP

(57) ABSTRACT

A method for controlling a playback tempo of an audio track to be presented at an audio output, the audio track comprising a plurality of audio components, a first audio component of the plurality of audio components being associated with a plurality of sets of audio data, wherein each set of audio data in the plurality of sets of audio data is associated with a respective playback tempo range, the method comprising receiving a playback tempo for presenting the audio track at the audio output, selecting, from the plurality of sets of audio data, a set of audio data that has an associated playback tempo range comprising the received playback tempo, and allocating the selected set of audio data to the first audio component for presenting the audio track at the audio output.

34 Claims, 7 Drawing Sheets

(51) Int. Cl.
*G10H 1/00* (2006.01)
*G11B 27/10* (2006.01)

(52) U.S. Cl.
CPC ..... *G11B 27/105* (2013.01); *G10H 2210/076* (2013.01); *G10H 2220/371* (2013.01); *G10H 2240/131* (2013.01)

(56) References Cited

U.S. PATENT DOCUMENTS

| | | | |
|---|---|---|---|
| 8,704,068 B2* | 4/2014 | Bowen | A63B 71/0686 84/612 |
| 8,865,991 B1 | 10/2014 | Alves et al. | |
| 2003/0104785 A1* | 6/2003 | Iwanaga | H04M 1/578 455/66.1 |
| 2006/0107822 A1 | 5/2006 | Bowen | |
| 2008/0051919 A1 | 2/2008 | Sakai et al. | |
| 2009/0049979 A1 | 2/2009 | Naik et al. | |
| 2009/0157203 A1* | 6/2009 | Bregar | G11B 27/10 700/94 |
| 2009/0177097 A1 | 7/2009 | Ma et al. | |
| 2010/0011941 A1 | 1/2010 | Becker et al. | |
| 2010/0168879 A1 | 7/2010 | Takatsuka et al. | |
| 2013/0263720 A1 | 10/2013 | Sugano | |
| 2014/0160352 A1 | 6/2014 | Chen et al. | |
| 2014/0260911 A1 | 9/2014 | Maezawa | |
| 2014/0288679 A1* | 9/2014 | McNamee | A63F 13/211 700/91 |
| 2014/0338516 A1 | 11/2014 | Andri | |
| 2014/0354434 A1 | 12/2014 | Lalonde | |
| 2016/0313972 A1* | 10/2016 | Kulavik | G06F 3/165 |

FOREIGN PATENT DOCUMENTS

| | | |
|---|---|---|
| JP | H10-063265 | 3/1998 |
| WO | WO 2010034063 | 4/2010 |
| WO | WO2014003072 | 1/2014 |
| WO | WO2018104744 | 6/2018 |
| WO | WO2018104745 | 6/2018 |

OTHER PUBLICATIONS

International Search Report and Written Opinion dated Mar. 14, 2018 in International Patent Application No. PCT/GB2017/053690.
U.S. Appl. No. 16/467,925, filed Jun. 7, 2019.
Examination Report dated May 11, 2020 in EP Patent Application No. 17817050.2, pp. 1-6.
Notice of Allowance dated Jul. 16, 2020 in U.S. Appl. No. 16/467,925, pp. 1-14.
Office Action dated Feb. 28, 2020 in U.S. Appl. No. 16/467,925.
Office Action dated Aug. 27, 2020 in CN Patent Application No. 201780085855.0, pp. 1-14.
Apple Corp., "GarageBand Getting Started, Garageband at a Glance; Using Apple Loops; Working in the Timelime; Working with Real Instruments; Keyboard Shortcuts; Connecting Music Equipment To Your Computer", Jan. 1, 2005, p. 1-26, at: http://manuals.info.apple.com/en_US/GarageBand2_GettingStarted.pdf.
Examination Report dated Sep. 23, 2021 in EP Patent Application No. 17817050.2, pp. 1-16.
Extended European Search Report dated Oct. 18, 2021 in EP Patent Application No. 21158633.4, pp. 1-15.
Karageorghis, C., et al., "Music in the excercise domain: a review and synthesis (Part I)", International Review of Sport and Exercise Psychology, vol. 5, No. 1, Mar. 1, 2012, pp. 44-66.
Karageorghis, C., et al., "Music in the excercise domain: a review and synthesis (Part II)", International Review of Sport and Exercise Psychology, vol. 5, No. 1, Mar. 1, 2012, pp. 67-84.
Office Action dated Jun. 24, 2021 in IN Patent Application No. 201917024943, pp. 1-5.
Office Action dated Jul. 7, 2021 in IN Patent Application No. 201917024942, pp. 1-6.
Office Action dated Sep. 29, 2021 in U.S. Appl. No. 17/213,139, pp. 2-8.
Office Action dated Dec. 14, 2021 in JP Patent Application No. 2019-551758, pp. 1-3.
Office Action dated Dec. 14, 2021 in JP Patent Application No. 2019-551759, pp. 1-3.

* cited by examiner

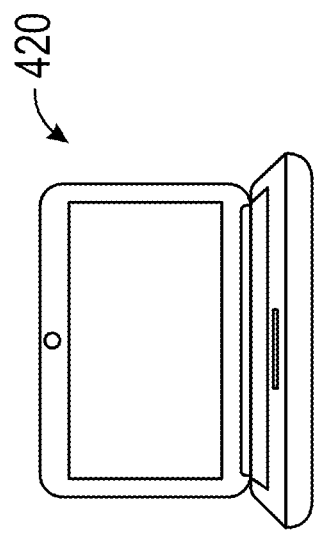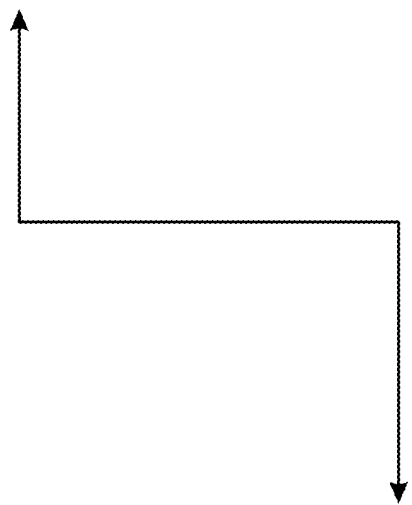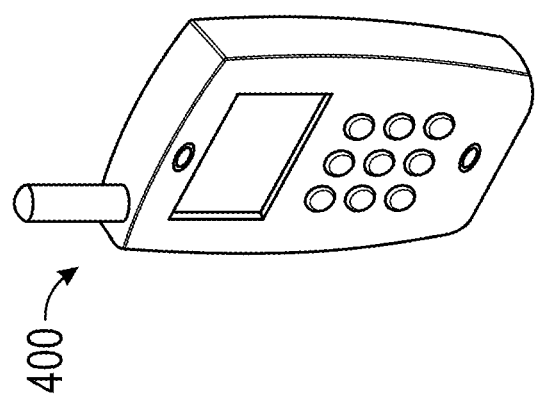
Figure 4

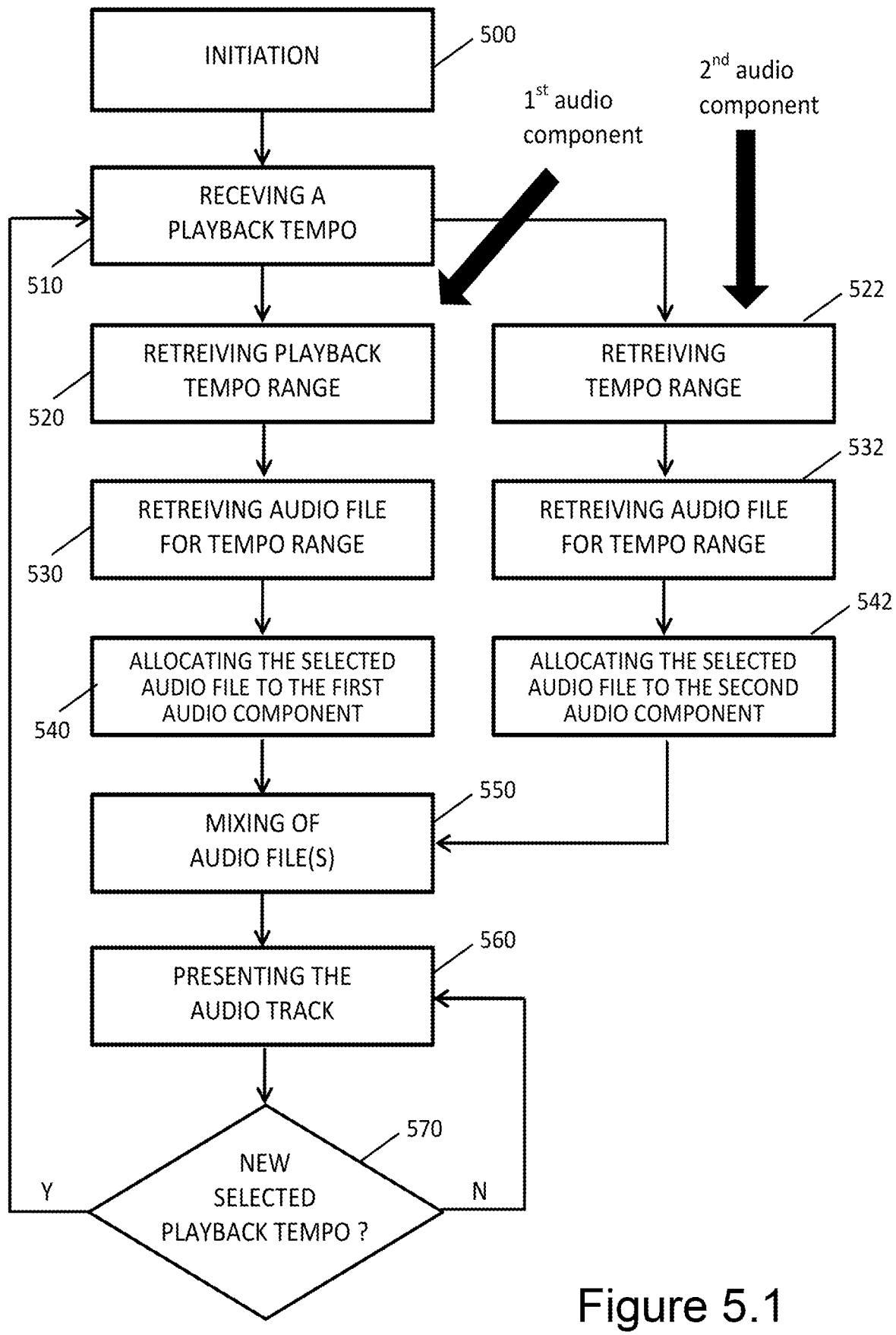
Figure 5.1

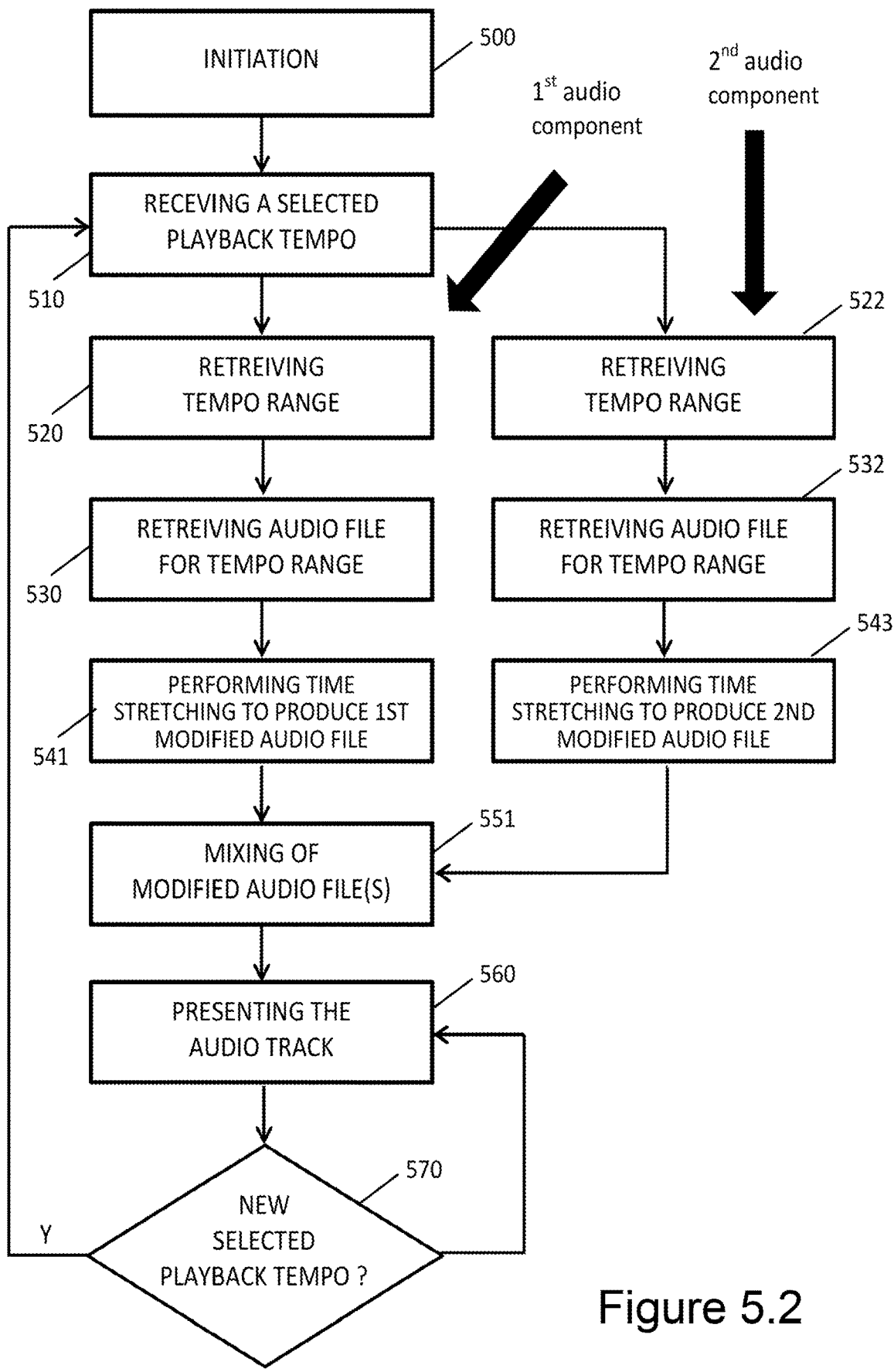
Figure 5.2

VARIATIONS AUDIO PLAYBACK

FIELD

The present disclosure relates to a method for playing a set of audio data such as a music track. More specifically, it relates to a method for controlling the playback tempo of a music track.

BACKGROUND

In the music industry, many music tracks are remixed, i.e. reworked, to create a different song. Even if the melody is kept for the most part, the remix will generally change the song's original rhythm or tempo to create a different atmosphere or ambiance. For example, a song can be accelerated for an upbeat effect or slowed down to give it a more relaxed feel.

The process of remixing a musical track to a different tempo is a complex one. Songs or music tracks are generally the result of a mixing of several sets of audio data, for instance 8 sets of audio data, each set of audio data being allocated to an audio component with a specific function (vocal 1, vocal 2, beat . . . ) or instrument (piano, guitar, harp, saxophone, bass . . . ). Each set of audio data, and consequently the music track itself, is characterized by a playback tempo it is intended to be presented or played at.

Changing the playback tempo of the track can significantly disrupt the original arrangement since the individual components are not adapted for different tempos. Therefore the audio components, more specifically the allocated sets of audio data, are generally reworked by music editors to produce an arrangement for the music track that can please audiences. The remix will generally consist of both an artistic and technical work to change the playback tempo while producing a new arrangement that is also pleasing to the ear.

There is a desire to dynamically update the tempo of a music track without the need for complex rearrangement of the individual audio components that make up the track. However, simply speeding up or slowing down a music track will impact its pitch, and the resulting playback may sound bizarre to the listener. Time stretching a set of audio data allows control of the pitch so that the difference in playback tempo reduces the effect on the artistic arrangement. The issue with time stretching is that, past a certain percentage increase or decrease in the original playback tempo, the available tools as well as the artistic skills of a music editor cannot compensate for the coarse deformation of the arrangement.

Therefore, a method is required for dynamically updating the tempo of a music track over a large range of tempos whilst maintaining the fidelity of the original arrangement. Specifically, there is a need to effect such a change of tempo while a listener is listening to the music track One application of this is in exercise, specifically the synchronous application of music, where an athlete consciously ties in his or her stride rate to the rhythm of music. This can result in increased motivation and rhythmicity of movement, resulting in an efficiency gain that is associated with lower relative oxygen uptake (see Music in the exercise domain: a review and synthesis (Part II), Terry, P. C. & Karageorghis, C.I. (2011).

US2014288679 discloses methods and systems for receiving information descriptive of a pace at which a user is exercising, presenting video content depicting a race at a playback speed dependent on the pace, and displaying a dashboard including an indication of the pace.

US2016313972 discloses an electronic device that may comprise audio processing circuitry, pace tracking circuitry, and positioning circuitry. The pace tracking circuitry may be operable to selects songs to be processed for playback, and/or control time stretching applied to such songs, by the audio processing circuitry based on position data generated by the positioning circuitry, a desired tempo, and whether the songs are stored locally or network-accessible.

SUMMARY

According to an aspect, there is provided a method for controlling a playback tempo of an audio track to be presented at an audio output, the audio track comprising a plurality of audio components, a first audio component of the plurality of audio components being associated with a plurality of sets of audio data, wherein each set of audio data in the plurality of sets of audio data is associated with a respective playback tempo range, the method comprising receiving a playback tempo for presenting the audio track at the audio output, selecting, from the plurality of sets of audio data, a set of audio data that has an associated playback tempo range comprising the received playback tempo, and allocating the selected set of audio data to the first audio component for presenting the audio track at the audio output.

Optionally, each of the other audio components of the plurality of audio components is associated with at least one set of audio data and each set of audio data has an associated playback tempo range. Optionally, the method further comprises determining, for a second audio component of the plurality of audio components, if a set of audio data exists that has an associated playback tempo range comprising the received playback tempo, selecting, for the second audio component of the plurality of audio components, the respective set of audio data that has an associated playback tempo range comprising the received playback tempo, and allocating the selected set of audio data to the second audio component of the plurality of audio components for presenting the audio track at the audio output.

Optionally, for the first audio component, the playback tempo range of each of the plurality of sets of audio data is different from the playback tempo range of the others of the plurality of sets of audio data. Optionally, the playback tempo range of a set of audio data of the first audio component is different from the playback tempo range of a set of audio data of a different audio component. Optionally, each set of audio data is further associated with a predetermined playback tempo at which it is intended to be presented, the predetermined playback tempo comprised in the playback tempo range of the set of audio data, the allocating to an audio component further comprising performing a time stretching process of the selected set of audio data, the time stretching process comprising transforming the selected set of audio data from the predetermined playback tempo to produce a modified set of audio data intended to be presented at the received playback tempo, and using the modified set of audio data as the selected set of audio data for the allocating to the audio component.

Optionally, the method further comprises receiving an updated playback tempo, and updating the selected set of audio data based on the updated playback tempo. Optionally, if the updated playback tempo is comprised within the playback tempo range of the selected set of audio data, updating the selected set of audio data comprises performing a time stretching process on the selected set of audio data to provide an updated modified set of audio data intended to be presented at the updated playback tempo, and replacing the selected set of audio data allocated to the audio component with the updated modified set of audio data. Optionally, if the updated playback tempo is not comprised within the playback tempo range of the selected set of audio data, updating the selected set of audio data comprises replacing the selected set of audio data with a set of audio data that is associated with a playback tempo range comprising the updated playback tempo.

Optionally, the method further comprises, after changing the selected set of audio data, performing a time stretching process on the selected set of audio data c to provide an updated modified set of audio data intended to be presented at the updated playback tempo. Optionally, the method further comprises presenting the audio track at the audio output.

Optionally, the method further comprises presenting the audio track at the audio output, and wherein the updated playback tempo is received at a first time instant into the presentation of the audio track, and presenting the audio track at the audio output takes into account the first time instant. Optionally, presenting the audio track comprises implementing a cross fade between the selected set of audio data and the updated set of audio data after the first time instant. Optionally, the method further comprises, if the updated playback tempo is not comprised within the playback tempo range of the selected set of audio data, presenting the audio track using the updated set of audio data using a delay after the first time instant.

Optionally, the playback tempo defines an interval of time between beats for the presentation of the audio track, the delay being a function of a pre-set number of completed beats. Optionally, receiving a playback tempo comprises receiving a user input. Optionally, the user input is a current user cadence. Optionally, the method further comprises setting a number of beats per minute of the playback tempo to be the same as a number of steps per minute of the current user cadence.

Optionally, the user input is a desired playback tempo. Optionally, the user input is a target value of a user parameter, the method further comprising converting the target user parameter into the playback tempo. Optionally, the target value of a user parameter is a target user cadence, a target user heart rate or a target user speed. Optionally, the target value of the user parameter is a target user cadence, the method further comprising setting a number of beats per minute of the playback tempo to be the same as a number of steps per minute of the target user cadence. Optionally, the target value of the user parameter is a target user heart rate and wherein converting the target user heart rate into a playback tempo is based on a resting heart rate of the user or a current heart rate of the user. Optionally, the target value of the user parameter is a target user speed and wherein converting the target user speed into a playback tempo is based on a stride length of the user.

Optionally, the method further comprises monitoring a current value of the user parameter, and updating the playback tempo if the current value of the user parameter does not match the target value of the user parameter. Optionally, updating the playback tempo comprises increasing the playback tempo if the current value of the user parameter is below the target value of the user parameter, or decreasing the playback tempo if the current value of the user parameter is above the target value of the user parameter.

Optionally, the method further comprises receiving a first user input corresponding to a first period and a second user input corresponding to a second period, determining a first playback tempo for the first period based on the first user input, and determining a second playback tempo for the second period based on the second user input.

Optionally, the method further comprises receiving a first user input corresponding to a first distance to be run by the user and a second user input corresponding to a second distance to be run by the user, determining a first playback tempo for the first distance to be run by the user based on the first user input, and determining a second playback tempo for the second distance to be run by the user based on the second user input.

According to a further aspect, there is provided an electronic device for controlling a playback tempo of an audio track to be presented at an audio output, the electronic device comprising a processor configured to perform the method.

According to a further aspect, there is provided a system comprising an audio output for presenting an audio track, and an electronic device comprising a processor configured to perform the method.

According to a further aspect, there is provided a computer readable medium comprising computer readable instructions configured, in use, to enable a processor to perform the method.

BRIEF DESCRIPTION OF THE DRAWINGS

Exemplary embodiments of the disclosure shall now be described with reference to the drawings in which:

FIG. 4 is a schematic drawing of another arrangement of the present method and comprising a user device and a remote device;

FIGS. 5.1 and 5.2 are flow diagrams showing the general operational steps implemented by a processor according to different arrangements of the present method.

DETAILED DESCRIPTION

Figure 1:
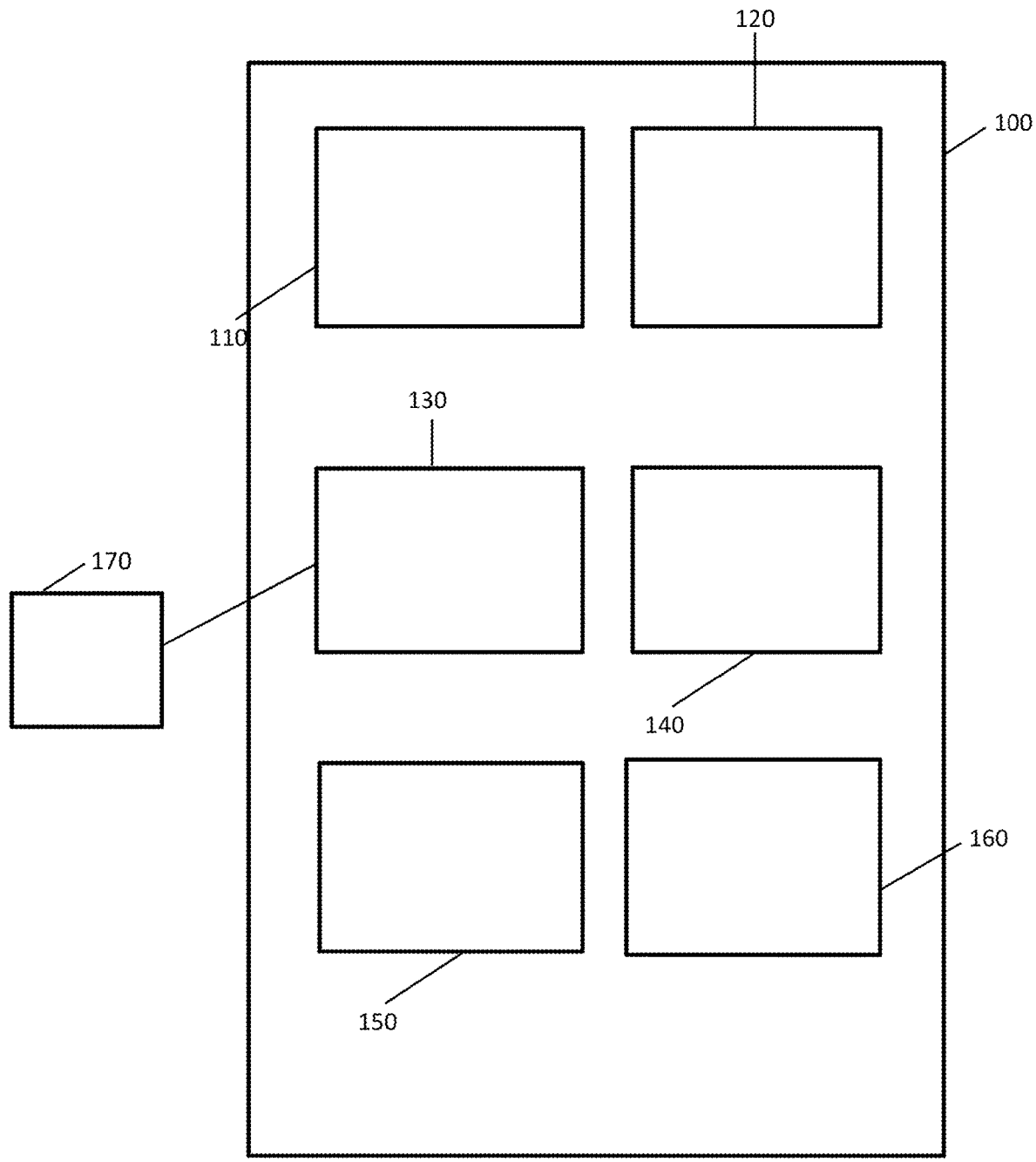
FIG. 1 is a schematic representation of a user device according to the present disclosure.

FIG. 1 depicts a user device 100 that can be used for playback of audio tracks, specifically music tracks. The user device 100 may be a smartphone, a portable media player or any other device capable of playing audio. The user device 100 comprises a processor 110 for executing instructions of a computer program to perform the methods described herein. The user device 100 also comprises a memory 120 for storing a plurality of adaptive media files, each adaptive media file made up of a plurality of sets of audio data corresponding to different audio components of a music track. The sets of audio data may be contained in one or more audio files, and a configuration file may define the relevant details of the files, such as playback tempo ranges and relationships between sets of data including the characteristics of transitions between sets of data, as will become apparent later. The user device 100 further comprises a receiver/transmitter unit 130 for exchanging data by either a wireless or a wired connection. The data exchanged may be audio data or other type of data needed to implement the present audio mixing solution. Alternatively, the data could be user data such as a user heart rate as measured by a heart rate monitor 170. The user device 100 also comprises a touch sensitive display 140 and a plurality of sensors 150, for defining inputs such as a playback tempo for audio tracks, as explained hereafter. The sensors 150 comprise an accelerometer, a gyroscope and/or a GPS tracker. The user device 100 further comprises an audio output 160 which may take the form of a speaker or a headphone jack.

A user of user device 100 may wish to use the device to play music, for example during exercise. A user may wish for music to be played at a given tempo which allows the user, when running, to synchronise his or her cadence (the number of steps taken per minute) to the tempo of the music. The user device 100 is able to play music at a tempo input by the user by implementing the methods described herein. The user is able to input the desired tempo in a number of ways.

In a first embodiment, the user may input a desired tempo in beats per minute (bpm) via the touch sensitive display 140. In this way, the user can set a constant tempo for musical playback from the device. The user can then synchronise his or her cadence to the beat of the music which allows a constant step rate to be maintained over the duration of a run.

In a variation of this embodiment, the user may input a programme of different tempos or cadences to be followed over the duration of a run. For example, the user may wish the first kilometre of a 5 kilometre run to be at a cadence of 60 steps per minute, the next 3 kilometres to be at a cadence of 80 steps per minute, and the final kilometre to be at a cadence of 70 steps per minute. The user enters this programme into the user device 100 via the touch sensitive display 140. The user may set a music tempo of 60 bpm for the first kilometre, 80 bpm for the next 3 kilometres and 70 bpm for the final kilometre. Alternatively, the user may input the target cadences and the processor 100 converts the cadences into the tempo using a one-to-one ratio.

In the case that the user inputs different tempos or cadences to start at different distances, the user device 100 uses a GPS tracker in the plurality of sensors 150 to track the progress of the user and update the tempo at the correct distance. The music is then played at the desired tempo for the different stages of the run and the user is able to synchronise his or her cadence to the tempo of the music.

It will be envisaged that the user could input any desired number of stages at any desired distance for each stage. It will also be envisaged that different methods of setting a programme are possible, for example dividing the run into stages by time rather than distance, in which case the user device 100 would use an internal clock to monitor for when the tempo should be updated.

During the course of the run, the user device 100 can monitor the actual cadence of the user using accelerometers in the plurality of sensors 150. If, during the course of the run, the user's cadence drops below the tempo of the music, the processor 110 can increase the tempo of the music to encourage the user to increase his or her cadence until the user reaches the pre-set cadence. Similarly, if the user's cadence is above the tempo of the music, the processor 110 can decrease the tempo of the music to encourage the user to reduce his or her cadence until the user reaches the pre-set cadence.

In another embodiment, the user may input a target heart rate that he or she wishes to achieve during the run, for example 160 bpm. The processor 110 calculates the tempo of music that corresponds to a required cadence which will result in the user reaching the target heart rate. This can be calculated by using historic user data, a normal resting heart rate of the user or a current heart rate of the user measured by the heart rate monitor 170. Initially, the processor 110 uses historic user heart rate and cadence data to determine a cadence of the user that corresponds to the target heart rate. In this instance, the user device 100 is connected to the heart rate monitor 170. In this way, and also similarly to the first embodiment, the heart rate monitor 170 can be used to measure the actual heart rate of the user during the run, and the processor 110 can increase or decrease the tempo of the music accordingly to ensure the user's heart rate is maintained at the desired level. Data representing the correspondence between the cadence of the user and the user's heart rate can be stored for use in the future. Similarly to the first embodiment, the user can set different target heart rates to correspond to different stages of the run.

In another embodiment, the user may input a target pace at which they wish to run. This may be a speed in m/s, km/h, miles per hour (mph) or the like. Using user profile data such as the user's stride length, the processor 110 calculates the required cadence for the user to run at the target pace and sets the music to play at the corresponding tempo. The processor 110 can use historical user pace and cadence data to determine a cadence of the user that corresponds to the target pace. Again, the user can set different target paces to correspond to different stages of the run.

Also, a GPS tracker in the plurality of sensors 150 can be used to monitor the user's progress during the run. If the user's pace drops below the target pace at a given point of the run, the processor 110 can increase the tempo of the music to encourage the user to increase his or her speed. Similarly, if the user's pace is above the tempo of the music, the processor 110 can decrease the tempo of the music to encourage the user to slow down.

The user may also be able to "mix-and-match" each of the above embodiments by dividing the run into different stages, by distance and/or time, and set different types of target for each stage. For example, the user may wish to run 2 kilometres at 60 steps per minute, 60 seconds at a heart rate of 160 bpm and 1 kilometre at a pace of 8 km (around 2.2 m/s).

Figure 2:
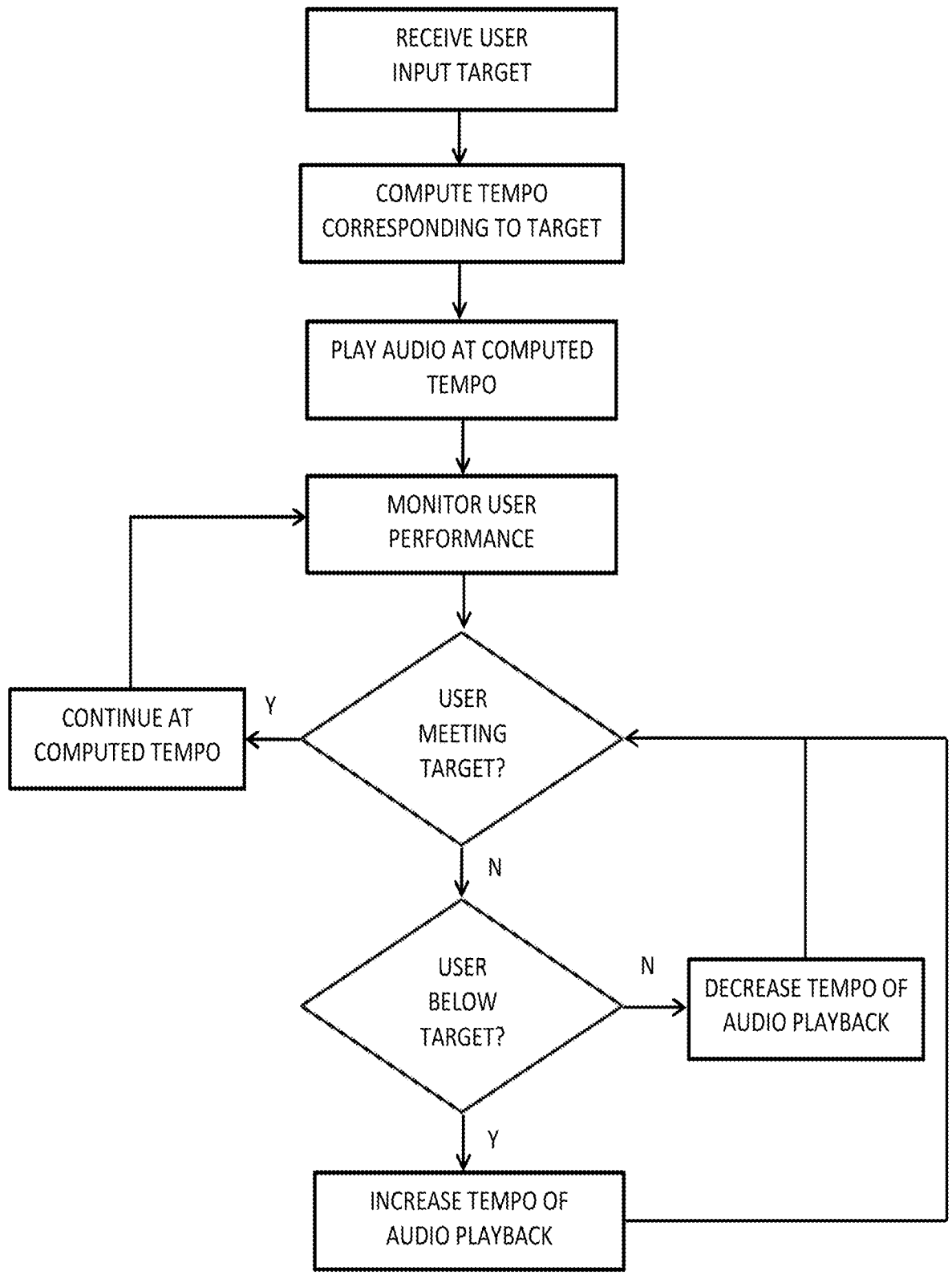
FIG. 2 is a flowchart for dynamic update of music tempo based on a user input.

A method 200 for dynamically updating the tempo of music playback based on user performance is shown in FIG. 2. The method is performed by the user device 100.

The method begins at step 202, where the user device 100 receives an input from the user indicating a target for a run. As discussed above, the target may be a target cadence, a target heart rate or a target pace.

At step 204, the processor 110 computes the tempo that corresponds to the target input by the user at step 202. If the user has input a cadence target, the tempo is a simple 1 to 1 mapping of the cadence in steps per minute to the tempo in bpm. If a heart rate or pace target is set, user profile data are used in the computation of the tempo, as discussed above.

At step 206, music is played at the computed tempo. The playback of the music at the computed tempo is achieved by the methods described in relation to FIGS. 5.1 and 5.2.

At step 208, the user device 100 monitors the user's performance in relation to the target. If the user has input a cadence target, accelerometers in the plurality of sensors 150 are used to measure the actual cadence of the user. If the user has input a heart rate target, the heart rate monitor 170 is used to measure the actual heart rate of the user. If the user has input a pace target, a GPS tracker in the plurality of sensors 150 is used to measure the actual pace of the user.

At step 210, a determination is made as to whether the user is meeting the target or not. If the user is not meeting the target, the method moves to step 212 where a determination is made as to whether the user is performing below the target or above the target. If the user is performing below the target, for example at a lower cadence, heart rate or pace than the target, then the processor 110 increases the tempo of music playback at step 214. If the user is not performing below the target (i.e., is performing above the target), for example at a higher cadence, heart rate or pace than the target, then the processor 110 decreases the tempo of music playback at step 216. Once the tempo has been increased or decreased, the method returns to step 208 where the user device 100 continues to monitor the user's performance in relation to the target.

If, at step 210, it is determined that the user is performing at the target, then the user device 100 plays music at the tempo computed in relation to the target at step 218.

This will be a simple continuation of the playback if the user has always been performing at the target, or will be a resumption of the originally computed tempo if the tempo had been previously increased or decreased due to the user not performing at the target. The method again returns to step 208 where the user device 100 continues to monitor the user's performance in relation to the target.

In another embodiment, the user may not set a target at all. Instead, the user may run at a natural cadence and accelerometers in the plurality of sensors 150 measure the cadence of the user. This information can then be fed to the processor 110 which then sets the tempo of the music to match the cadence of the user. If the user increases their cadence, then the tempo of the music is increased. Similarly, if the user decreases their cadence, then the tempo of the music is decreased.

The way in which the processor 110 updates the tempo of a musical track based on an input will now be explained.

Figure 3:
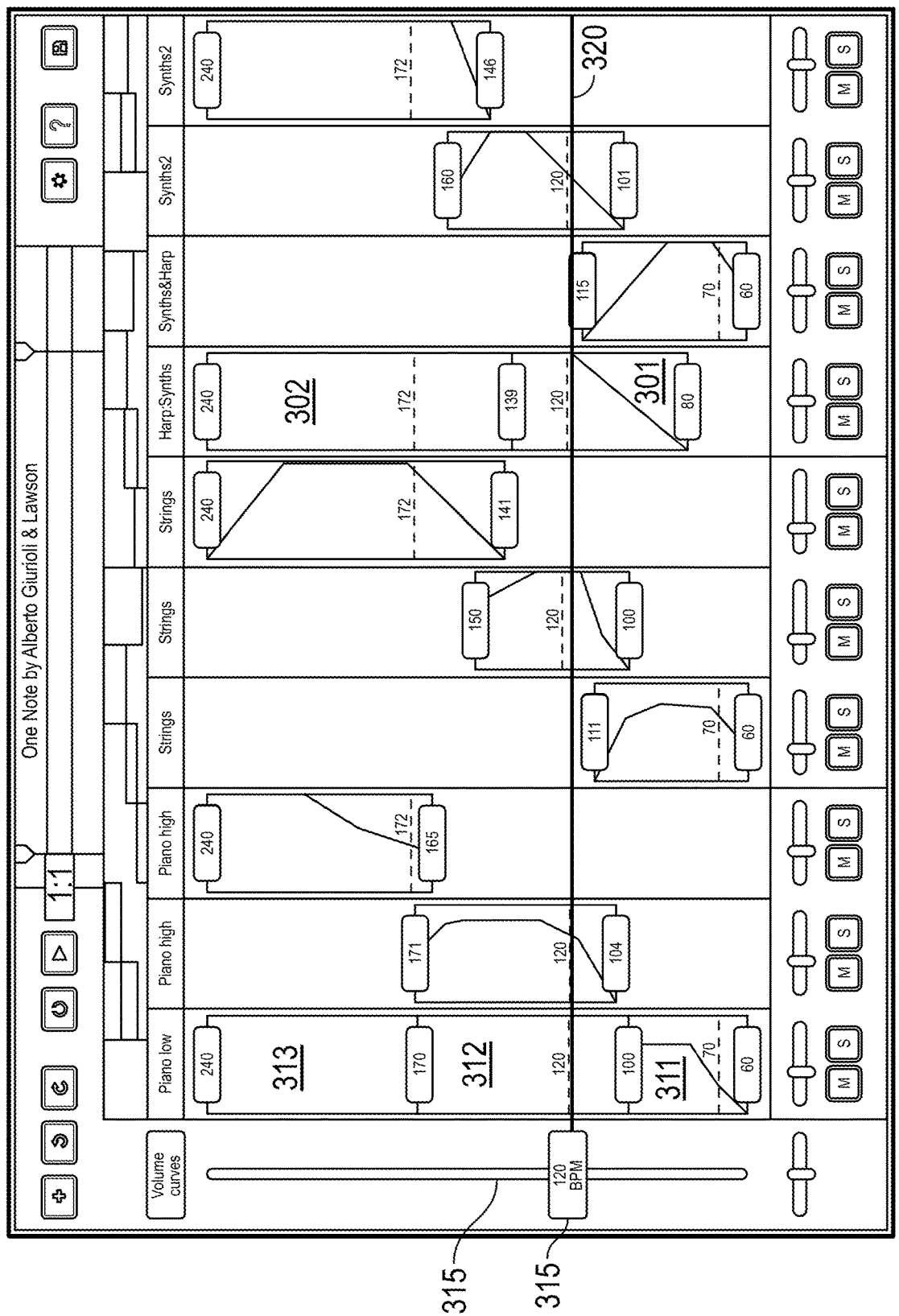
FIG. 3 is an exemplary representation of a music track according to the present disclosure.

An audio track such as a song generally comprises one or more audio components. Each audio component corresponds to a different part of the audio track, for example different instruments, vocal etc. An illustration of an adaptive media file for producing an audio track can be seen in FIG. 3, showing an adaptive media file with 10 audio components represented by bar elements extending vertically. Audio components can each correspond to a respective audio channel, or audio components comprised of more than one set of audio data could be spread over more than one audio channel. For example, in FIG. 3, the "Piano low" audio component corresponds to a single audio channel and the "Piano high" audio component corresponds to two audio channels. The playback tempo of the track is indicated on the vertical axis.

Each audio component has one or more sets of audio data represented by different sections of the bar elements. Each section corresponds to a playback tempo range. As such, the sections do not overlap in the vertical direction and are each delimited with first and second borders in the vertical direction. Looking at the "Piano low" audio channel, 3 sections 311, 312 and 313 are respectively associated to the playback tempo ranges 60-100 bpm, 100-170 bpm and 170-240 bpm, the values being expressed in bpm. The "Harp:Synths" audio channel comprises 2 sections 301 and 302, respectively associated to the playback tempo ranges 80-139 bpm and 139-240 bpm. The playback tempo range may be seen as the range of playback tempos over which a set of audio data may be used, for a given audio component. The playback tempo ranges may be adjacent, i.e. that the highest level of a first playback tempo range corresponds to the lowest level of a second playback tempo range. In that case, the two contiguous playback tempo ranges share a common playback tempo boundary.

During recording the sets of audio data, a musician may play the same series of notes on an instrument at several tempos so as to record the necessary number of sets of audio data. Similarly, a singer may sing the same melody at different speed to define a plurality of sets of audio data for a voice audio component. In alternative arrangements the notes and melody may be adapted suit the respective recording tempos. The different tempos in the example of FIG. 3 are 70, 120 and 172 bpm. These predetermined playback tempo values correspond to what may be referred to as native playback tempos of the respective sets of audio data. They define the playback tempo at which a set of audio data is intended to be presented (e.g. the initial tempo of the voice, instrument, beat, etc.) as the set of audio data was recorded. The native playback tempo for a set of audio data is comprised in the playback tempo range for this set of audio data.

The implementation of audio tracks comprised of a plurality of audio components and sets of audio data allows the tempo to be selected and tracks to be mixed dynamically, as will be discussed in relation to FIGS. 5.1 and 5.2. This audio mixing may be either entirely implemented by the processor 110 of the user device 100 using sets of audio data stored in the memory 120 of the user device 100.

Alternatively, the audio mixing may be enabled through a client/server relationship as illustrated in FIG. 4. A device 400 comprising a user interface 410 is arranged to receive a playback tempo for a music track, for example in one of the manners discussed above in relation to running. The relevant sets of audio data may be accessed from one or more databases (not shown in FIG. 4) on a remote server 420 and downloaded to the device 400 for processing. Alternatively, the audio component management as well as the selection of the relevant playback tempo ranges and corresponding sets of audio data may be carried out at a remote server 420 which operates also the access to databases where the sets of audio data are stored.

The present audio mixing method will now be illustrated in relation to FIG. 5 showing a flowchart of the different operations or steps to carry out the method.

FIG. 5.1 is an illustrative flowchart of the present method according to a first arrangement. The method may be carried out by the processor 100 of the user device 100 of FIG. 1, or alternatively by a processor of the distant electronic device like server 410. In an initiation step 500, once a music track is chosen, the different sets of audio data for the music track are loaded from the memory 120 of the user device 100. Alternatively, the sets of audio data may be streamed over the air in any available standard audio format or downloaded from a remote memory.

As discussed above, each set of audio data corresponds to an audio component. Each component corresponds to part of a music track such as an instrument, a beat, or one or more voices. Each component may be allocated to a single audio channel or, if a component is made up of a number of sets of audio data, a number of channels. Each of the sets of audio data is associated with a playback tempo range. In the instance that more than one set of audio data is loaded for a given component, each set of audio data covers a different tempo range. A set of audio data may further be associated to a native playback tempo corresponding to the initial tempo it is intended to be presented at, e.g. a tempo it was recorded at.

In a further step 510, the processor 110 will receive a playback tempo for presenting the music track, for example in one of the manners discussed above in the context of running. Each time the user inputs a playback tempo the present solution enables the selection of a set of audio data having a playback tempo range that comprises the input playback tempo for each audio component. Steps 520 to 550 are now described generally for a first audio component.

In step 520, the processor 110 determines whether or not a set of audio data exists for the audio component that has a playback tempo range comprising the received playback tempo. If so, it will then at a further step 530 select the associated to the playback tempo range comprising the received playback tempo. In a subsequent step 540, the processor 110 will allocate the selected set of audio data to the first audio component for presenting at a later step 560 the music track at the audio output 160 of the user device 100.

For illustration, FIG. 3 shows an additional bar element 315 extending in the horizontal direction indicative of an input playback tempo of 120 bpm. In this case, the set of audio data 312 corresponding to the range 100-170 bpm for the low piano is selected and the set of audio data 301 for the range 80-139 bpm for the harp is selected. These sets of data are then allocated to their respective audio components for presenting the music track.

As the music track comprises one or more additional audio components that form, with the first audio component, a plurality of audio components, the presentation of the music track comprises mixing of the plurality of audio components at step 550. As with the first audio component, each component is associated to at least one set of audio data, and each set of audio data to a playback tempo range. As with the first component, the steps 520 to 550 for the first component are repeated for other component, as illustrated in FIG. 5.1 with steps 522 to 552 for a second audio component. In other words, for each additional or current audio component, the steps of:

identifying and selecting, from a plurality of sets of audio data associated with a given audio component, a set of audio data that is associated to a playback tempo range comprising the received playback tempo; and allocating the selected set of audio data to the given audio component for presenting the music track at the audio output 160 of the user device 100;

are repeated.

The user may change the playback tempo at any point in the track. If a new playback tempo is received at step 570 (answer "Yes" to step 570), the process will return to step 510 to update the playback tempo range for each audio component and consequently change sets of audio data as necessary. In the present solution, a given audio component may comprise two consecutive playback tempo ranges that may be contiguous and share a common playback tempo boundary. When this common playback tempo boundary is crossed due to an increase in the input playback tempo, the selected set of audio data will change. In this situation, the update in playback tempo will cause the processor 110 to "turn off" the currently selected set of audio data and "turn on" the set of audio data associated to the playback tempo range that the updated playback tempo belongs to.

In the example of FIG. 3, if the playback tempo is changed from 120 bpm to 100 bpm, the section of the "Piano high" audio component which ranges from 104-171 bpm is stopped. The section of the "Synths & Harp" audio component which ranges from 60-115 bpm is started.

If the new playback tempo falls on a shared boundary between two sets of audio data of an audio component, as is the case for the "Piano low" audio channel in the example of FIG. 3, the processor 110 will use fade parameters to effect a cross-fade between the two adjacent sections. The fade parameters include a parameter stating whether the fading should start immediately after the playback tempo crosses the threshold bpm value, or whether the start should be delayed until the first beat of the next bar. The fade parameters also include a parameter specifying how quickly or slowly the fade should take place.

When no updated playback tempo is received at step 570 (answer "No" to step 570), the process will carry on presenting the music track with the current sets of audio data that are mixed in step 560.

If an input playback tempo does not exactly match the native tempo of a set of audio data, but falls within the tempo range of that set of audio data, a user may choose to enable time stretching for a set of audio data when initiating the present audio mixing. Time stretching is the process of changing the speed or duration of an audio signal without affecting its pitch so as to keep the song "familiar" to an ear besides the change of playback tempo. When the time stretching is disabled, as in the example of FIG. 5.1, an input playback tempo chosen over a playback tempo range will not affect the presentation of a set of audio data.

FIG. 5.2 shows an example of the present audio mixing solution where time stretching is enabled by the user. The steps in this additional arrangement are similar to the steps of the arrangement shown in FIG. 5.1, except for the allocating of steps 540 and 542 of FIG. 5.1 which are replaced respectively with steps 541 and 543.

Steps 541 and 543 respectively describe a time stretching process that is performed for a given set of audio data in the case that the input playback tempo differs from the native playback tempo of the set of audio data. More precisely, for a currently selected set of audio data, the processor 110 of the user device 100 will perform a time stretching process of the selected set of audio data, the time stretching process comprising transforming the selected set of audio data to produce a modified set of audio data intended to be presented at the input playback tempo with a controlled pitch. The modified set of audio data is then used in place of (or as) the selected set of audio data for allocating to the audio component.

In the example of FIG. 3, at a playback tempo of 95 bpm, the audio mixer will pick only the "Piano low" channel, the first "Strings" channel, the "Harp:Synths" channel and the "Synths & Harp" channel. The sets of audio data in these components have respective native playback tempos of 70 bpm, 70 bpm, 120 bpm and 70 bpm. Therefore, the sets of audio data are stretched from 70 to 95 bpm, except for the "Harp:Synths" set of audio data which is stretched from 120 down to 95 bpm.

Different techniques are available to the person skilled in the art in steps 541 and 543 to time stretch a set of audio data from its native playback tempo to generate a modified set of audio data intended to be presented at the received playback tempo. Similarly many techniques are available for the mixing step 551 of FIG. 5.2 in order to make the arrangement of the music track even more pleasing to the ear. These solutions are beyond the scope of the present description. Yet in the present solution, by limiting the impact of playback tempo ranges which may be too large for adequate time stretching, an improved playback tempo controller is proposed to a user.

The mixing step 550 of FIG. 5.1, which involves the mixing of the selected sets of audio data, is replaced in this additional arrangement of FIG. 5.2 with the mixing step 551, wherein the modified sets of audio data are mixed. Once mixed, the modified sets of audio data are mixed in step 551 into the music track intended to be presented at the received playback tempo, the present method is carried on at step 560 with presenting the music track for instance at the audio output 160 of the user device 100. As with the arrangement of FIG. 5.1, the processor 110 will carry on at step 570 with monitoring if a new playback tempo value is received.

When no new playback tempo is received (answer "No" to step 570), the present method will carry on with mixing the different audio components to present the music at the audio output 160 in step 560.

If an updated playback tempo is received (answer "Yes" to step 570), the processor 110 will consider the updated playback tempo as the new current playback tempo. It will carry on with repeating the steps 510 to 560 of FIG. 5.2 already described. In this case, two scenarios may unfold.

In the first scenario, the updated playback tempo is comprised within the same playback tempo range as the previous playback tempo such that there is no need to change the selected set of audio data. The updated playback tempo will instead impact the time stretching and the modified set of audio data requires an update. Indeed, using the same selected set of audio data as with the previous playback tempo, an updated modified set of audio data intended to be presented at the updated playback tempo is produced by time stretching the previous modified set of audio data, and the previous modified set of audio data allocated to the audio component is replaced with the updated modified set of audio data.

In the second scenario, the updated playback tempo is comprised in a different playback tempo range such that there is a need to change the selected set of audio data. This happens when the update playback tempo crosses a playback tempo boundary, for example between two contiguous playback tempo ranges. The processor 110 will then turn off the modified set of audio data and, if a set of audio data exists with a playback tempo range corresponding to the new playback tempo, turn on the set of audio data associated to the new playback tempo range. This is done prior to performing any time stretching that may be required to account for any difference in the updated playback tempo and the native playback tempo of the newly selected set of audio data.

When a change in sets of audio data occurs for an audio component, the rendering of the music track may be affected due for instance to the sudden change in set of audio data or a missed beat. Different solutions are presented hereafter to account for this situation. They will be illustrated in relation to the arrangement of the audio mixing solution of FIG. 5.2 when time stretching is involved, but may also be used when time stretching is not used or disabled.

Let us assume that the updated playback tempo is received at a first time instant, say 2 minutes, into the presentation of the music track. Then the presentation of the music track using the updated modified set of audio data for an audio component will take into account the first time instant, so as to make the presentation of the track gapless or continuous, despite the change in set of audio data.

The first time instant is used to determine, when a playback tempo threshold is crossed, the timing of turning off the previous set of audio data for the audio component that saw the threshold crossed (e.g. low piano channel at playback tempo of 100 bpm between intervals 311 and 312 in the example of FIG. 3) and turning on the updated modified set of audio data to be used instead.

In an additional arrangement of the present method, the user may define a cross fade between the previous modified set of audio data and the updated modified set of audio data, the cross fade being initiated after the first time instant. Consequently the turning off of the previous modified set of audio data may be carried out over a pre-set duration so as to soften the transition.

Additionally, as the received updated playback tempo causes a change in tempo range, the music track using the updated modified set of audio data may be presented using a delay after the first time instant. The delay may be defined in terms of a number of completed beats. The playback tempo that defines the speed at which a music track is presented can be seen as an interval of time between beats of the music track. The delay may be a function of a pre-set number of completed beats, measured either using the previous playback tempo or the updated one.

The transition from one set of audio data to the other may also control the volume associated with each set of audio data. Referring back to FIG. 3, each section, representing a set of audio data, is associated with a volume curve extending in the horizontal direction. When looking at the sections 301 or 311, the left-hand side of the sections will define a minimum value of e.g. 0 for the volume of the set of audio data, while the right-hand side edge will define a maximum value of e.g. 1. As may be seen from sections 301 and 311, a volume value, for instance comprised in the interval [0-1] or any other value range, may be defined for each playback tempo of the playback tempo range. The volume values define a volume curve over the tempo range, which may be used as an additional control over the sets of audio data. It may be advantageously used in the context of a transition between sets of audio data at a playback tempo threshold by reducing the volume closer to an upper limit of a first playback tempo range, and increasing the volume when moving to higher playback tempo values away from the lower limit of a second playback tempo range.

The volume curve may also be used to reduce the volume of a first set of audio data on the extremities of a playback tempo range of the first set of audio data, especially if no other set of audio data is available contiguously to the first sets of audio data.

The present audio playback method enables users to change the playback tempo of a music track in real time at any point in the track without restrictions on the tempo range and without poor performance at certain tempos. Using the present audio mixing solution, the listener can make adaptive tracks sound better at any tempo without the need of an expert or remixing professional.

In addition to the running application outlined above, this type of adaptive music playback is well suited to other specific activities. For example, a skiing app might make the speed of the track depend on the skier's speed: slow at the top of the hill; but faster as the skier skies downhill. At a party, user can take turns controlling the tempo of the music such that everyone dances to a selected beat. At a dance or exercise class, the instructor may explain the choreography at a slow tempo and as the students get acquainted with the steps the tempo of the music can be increased.

The applicant has found that a music track, using the present playback tempo control solution, will sound good over a very wide range of tempos, for instance, from 60 to 240 bpm and above. This allows transitions from walking at a low bpm to running at around 140 steps per minute, to long distance runners typically ran at a sustained 180 steps per minute and sprinting that happens well above 200 steps per minute. Many other activities for a listener will require adapting music at less extreme tempo needs.

While the above description discusses a system in which audio data is played, it will be appreciated that these principles apply to any application or media utilising audio. For example, video includes video frames and audio data as component parts of the overall video. This application could be applied to the audio parts of that video. As a result, many of the beneficial applications relating to running, skiing or other sports could be provided within a gym setting in which the user can listen to the audio and also watch associated visuals. The concept of changing a tempo of audio elements responsive to a user input change could also be applied to video frames.

The examples of audio applications provided throughout this document relate to music. However, it will be appreciated that the applications discussed could apply to other types of audio. For example, these principles could be applied to an audio track comprising audible instructions to a runner that have a rhythm, such as "left, right, left, right". These instructions could then vary depending on characteristics related to tempo.

Figure 6:
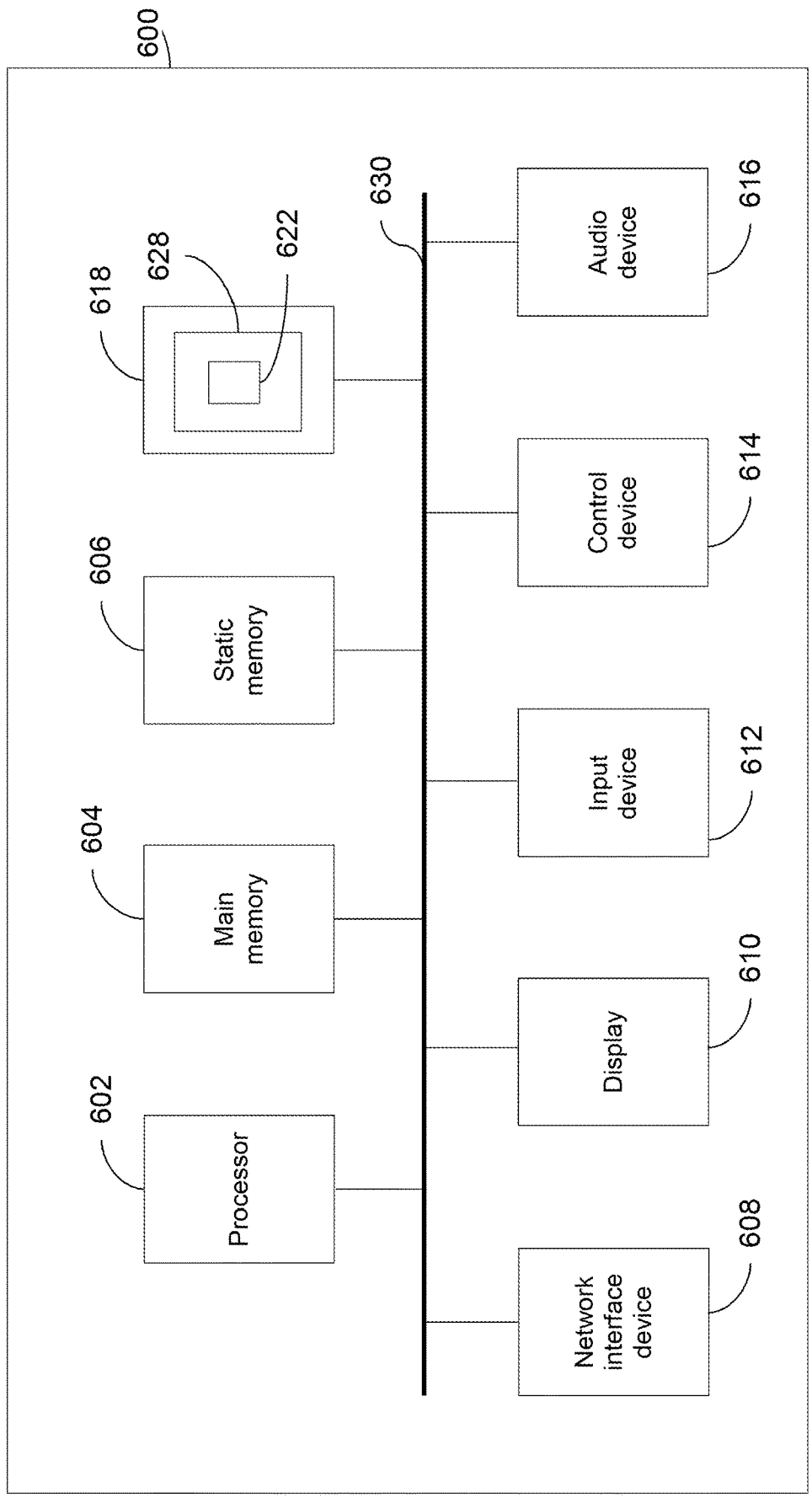
FIG. 6 illustrates a block diagram of one implementation of a computing device.

FIG. 6 illustrates a block diagram of one implementation of a computing device 600 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard or touchscreen), a cursor control device 614 (e.g., a mouse or touchscreen), and an audio device 616 (e.g., a speaker).

The data storage device 618 may include one or more machine-readable storage media (or more specifically one or more non-transitory computer-readable storage media) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining", "identifying", "selecting", "allocating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method for controlling a playback tempo of an audio track to be presented at an audio output, the audio track comprising a plurality of audio components, a first audio component of the plurality of audio components being associated with a plurality of sets of audio data, wherein each set of audio data in the plurality of sets of audio data is associated with a respective playback tempo range, the method comprising:
   receiving, by a hardware processor, a playback tempo for presenting the audio track at the audio output;
   selecting, by the hardware processor, from the plurality of sets of audio data, a set of audio data that has an associated playback tempo range comprising the received playback tempo;
   allocating, by the hardware processor, the selected set of audio data to the first audio component for presenting the audio track at the audio output receiving an updated playback tempo;
   updating the selected set of audio data based on the updated playback tempo;
   presenting the audio track at the audio output, wherein:
      the updated playback tempo is received at a first time instant into the presentation of the audio track; and
      presenting the audio track at the audio output takes into account the first time instant; and
   in response to the updated playback tempo being not comprised within the playback tempo range of the selected set of audio data, presenting the audio track using the updated set of audio data using a delay after the first time instant.

2. The method of claim 1, wherein each of the other audio components of the plurality of audio components is associated with at least one set of audio data and each set of audio data has an associated playback tempo range.

3. The method of claim 2, further comprising:
   determining, for a second audio component of the plurality of audio components, if a set of audio data exists that has an associated playback tempo range comprising the received playback tempo;
   selecting, for the second audio component of the plurality of audio components, the respective set of audio data that has an associated playback tempo range comprising the received playback tempo; and
   allocating the selected set of audio data to the second audio component of the plurality of audio components for presenting the audio track at the audio output.

4. The method of claim 1, wherein, for the first audio component, the playback tempo range of each of the plurality of sets of audio data is different from the playback tempo range of the others of the plurality of sets of audio data.

5. The method of claim 1, wherein the playback tempo range of a set of audio data of the first audio component is different from the playback tempo range of a set of audio data of a different audio component.

6. The method of claim 1, wherein each set of audio data is further associated with a predetermined playback tempo at which it is intended to be presented, the predetermined playback tempo comprised in the playback tempo range of the set of audio data, the allocating to an audio component further comprising:
   performing a time stretching process of the selected set of audio data, the time stretching process comprising transforming the selected set of audio data from the predetermined playback tempo to produce a modified set of audio data intended to be presented at the received playback tempo; and
   using the modified set of audio data as the selected set of audio data for the allocating to the audio component.

7. The method of claim 1, wherein updating the selected set of audio data comprises:
   in response to the updated playback tempo being comprised within the playback tempo range of the selected set of audio data, performing a time stretching process on the selected set of audio data to provide an updated modified set of audio data intended to be presented at the updated playback tempo, and replacing the selected set of audio data allocated to the audio component with the updated modified set of audio data.

8. The method of claim 1, wherein updating the selected set of audio data comprises:
   in response to the updated playback tempo not being comprised within the playback tempo range of the selected set of audio data, replacing the selected set of audio data with a set of audio data that is associated with a playback tempo range comprising the updated playback tempo.

9. The method of claim 8, further comprising, after changing the selected set of audio data, performing a time stretching process on the selected set of audio data to provide an updated modified set of audio data intended to be presented at the updated playback tempo.

10. The method of claim 1, further comprising presenting the audio track at the audio output.

11. The method of claim 1, wherein presenting the audio track comprises implementing a cross fade between the selected set of audio data and the updated set of audio data after the first time instant.

12. The method of claim 1, wherein the playback tempo defines an interval of time between beats for the presentation of the audio track, the delay being a function of a pre-set number of completed beats.

13. The method of claim 1, wherein receiving a playback tempo comprises receiving a user input.

14. The method of claim 13, wherein the user input is a current user cadence.

15. The method of claim 14, further comprising setting a number of beats per minute of the playback tempo to be the same as a number of steps per minute of the current user cadence.

16. The method of claim 13, wherein the user input is a target value of a user parameter, the method further comprising converting the target user parameter into the playback tempo.

17. The method of claim 16, wherein the target value of a user parameter is a target user cadence, a target user heart rate or a target user speed.

18. The method of claim 17, wherein the target value of the user parameter is a target user cadence, the method further comprising setting a number of beats per minute of the playback tempo to be the same as a number of steps per minute of the target user cadence.

19. The method of claim 17, wherein the target value of the user parameter is a target user heart rate and wherein converting the target user heart rate into a playback tempo is based on a resting heart rate of the user or a current heart rate of the user.

20. The method of claim 17, wherein the target value of the user parameter is a target user speed and wherein converting the target user speed into a playback tempo is based on a stride length of the user.

21. The method of claim 16, further comprising:
monitoring a current value of the user parameter; and
updating the playback tempo if the current value of the user parameter does not match the target value of the user parameter.

22. The method of claim 21, wherein updating the playback tempo comprises:
increasing the playback tempo if the current value of the user parameter is below the target value of the user parameter; or
decreasing the playback tempo if the current value of the user parameter is above the target value of the user parameter.

23. The method of claim 13, wherein the user input is a desired playback tempo.

24. The method of claim 23, the method further comprising:
receiving a first user input corresponding to a first period and a second user input corresponding to a second period;
determining a first playback tempo for the first period based on the first user input; and
determining a second playback tempo for the second period based on the second user input.

25. The method of claim 23, the method further comprising:
receiving a first user input corresponding to a first distance to be run by the user and a second user input corresponding to a second distance to be run by the user;
determining a first playback tempo for the first distance to be run by the user based on the first user input; and
determining a second playback tempo for the second distance to be run by the user based on the second user input.

26. An electronic device for controlling a playback tempo of a audio track to be presented at an audio output, the electronic device comprising a processor configured to perform the method of claim 1.

27. A non-transitory computer readable medium comprising computer readable instructions configured, in use, to enable a processor to perform the method of claim 1.

28. The method of claim 1, wherein the same part of the audio track comprises a series of notes, and wherein the series of notes is adapted to suit the respective recording tempo of the same part of the audio track.

29. The method of claim 1, wherein each respective set of audio data in the plurality of sets of audio data comprises metadata indicating that it is intended for use during playback of the audio track.

30. A system for controlling a playback tempo of an audio track to be presented, the audio track comprising a plurality of audio components, a first audio component of the plurality of audio components being associated with a plurality of sets of audio data, wherein each set of audio data in the plurality of sets of audio data is associated with a respective playback tempo range, comprising:
memory; and
a hardware processor configured to:
receive a playback tempo for presenting the audio track at an audio output;
select, from the plurality of sets of audio data, a set of audio data that has an associated playback tempo range comprising the received playback tempo;
allocate the selected set of audio data to the first audio component for presenting the audio track at the audio output;
receive an updated playback tempo;
update the selected set of audio data based on the updated playback tempo;
present the audio track at the audio output, wherein:
the updated playback tempo is received at a first time instant into the presentation of the audio track; and
presenting the audio track at the audio output takes into account the first time instant; and
in response to the updated playback tempo being not comprised within the playback tempo range of the selected set of audio data, present the audio track using the updated set of audio data using a delay after the first time instant.

31. The system of claim 30, wherein each respective set of audio data in the plurality of sets of audio data comprises metadata indicating that it is intended for use during playback of the audio track.

32. A method for controlling a playback tempo of an audio track to be presented at an audio output, the audio track comprising a plurality of audio components, a first audio component of the plurality of audio components being associated with a plurality of sets of audio data, wherein each set of audio data in the plurality of sets of audio data is associated with a respective playback tempo range, the method comprising:
receiving, by a hardware processor, a playback tempo for presenting the audio track at the audio output, comprising receiving a user input;
selecting, by the hardware processor, from the plurality of sets of audio data, a set of audio data that has an associated playback tempo range comprising the received playback tempo;
allocating, by the hardware processor, the selected set of audio data to the first audio component for presenting the audio track at the audio output;
receiving a first user input corresponding to a first distance to be run by the user and a second user input corresponding to a second distance to be run by the user;
determining a first playback tempo for the first distance to be run by the user based on the first user input; and determining a second playback tempo for the second distance to be run by the user based on the second user input.

33. An electronic device for controlling a playback tempo of an audio track to be presented at an audio output, the electronic device comprising a processor configured to perform the method of claim 32.

34. A non-transitory computer readable medium comprising computer readable instructions configured, in use, to enable a processor to perform the method of claim 32.

* * * * *

UNITED STATES PATENT AND TRADEMARK OFFICE
CERTIFICATE OF CORRECTION

PATENT NO. : 11,282,487 B2
APPLICATION NO. : 16/467919
DATED : March 22, 2022
INVENTOR(S) : Alan Cannistraro et al.

It is certified that error appears in the above-identified patent and that said Letters Patent is hereby corrected as shown below:

On the Title Page

Item (30) under Foreign Application Priority Data, "1620838" should be --1620838.1--

Signed and Sealed this
Eighteenth Day of June, 2024

Katherine Kelly Vidal
*Director of the United States Patent and Trademark Office*